US011157506B2

(12) United States Patent
Healing et al.

(10) Patent No.: US 11,157,506 B2
(45) Date of Patent: Oct. 26, 2021

(54) MULTIFORM PERSISTENCE ABSTRACTION

(71) Applicant: British Telecommunications Public Limited Company, London (GB)

(72) Inventors: Alexander Healing, London (GB); Paul Fagan, London (GB); Michael Turner, London (GB)

(73) Assignee: British Telecommunications Public Limited Company, London (GB)

( * ) Notice: Subject to any disclaimer, the term of this patent is extended or adjusted under 35 U.S.C. 154(b) by 543 days.

(21) Appl. No.: 16/086,186

(22) PCT Filed: Mar. 3, 2017

(86) PCT No.: PCT/EP2017/055080
§ 371 (c)(1),
(2) Date: Sep. 18, 2018

(87) PCT Pub. No.: WO2017/167543
PCT Pub. Date: Oct. 5, 2017

(65) Prior Publication Data
US 2020/0301922 A1    Sep. 24, 2020

(30) Foreign Application Priority Data
Mar. 30, 2016  (EP) .................... 16162909

(51) Int. Cl.
*G06F 16/2458* (2019.01)
*G06F 16/25* (2019.01)
(Continued)

(52) U.S. Cl.
CPC ........ *G06F 16/2471* (2019.01); *G06F 9/4493* (2018.02); *G06F 16/2365* (2019.01); *G06F 16/248* (2019.01); *G06F 16/256* (2019.01)

(58) Field of Classification Search
None
See application file for complete search history.

(56) References Cited

U.S. PATENT DOCUMENTS 8,046,374 B1    10/2011  Bromwich
2003/0174648 A1   9/2003  Wang et al.
(Continued)

FOREIGN PATENT DOCUMENTS

EP    2521049 A1    11/2012
GB    2537670 A  * 10/2016
(Continued)

OTHER PUBLICATIONS

Application as filed for U.S. Appl. No. 16/086,205, filed Sep. 18, 2018, Inventor(s): Fagan et al.
(Continued)

*Primary Examiner* — Scott A. Waldron
(74) *Attorney, Agent, or Firm* — Patterson Thuente Pedersen, P.A.

(57) ABSTRACT

A computer implemented method of data access to data stored in one or more data stores includes receiving a request to retrieve data from the one or more data stores; extracting characteristics of the request to classify the request according to a request classification; identifying a model for execution of one or more queries to one or more data stores; executing the one or more queries according to the model to formulate a response to the request, wherein the model for execution is identified based on a class of the request and includes an identification of one or more data stores to which the one or more queries are to be directed to formulate the response; and monitoring execution of one or more queries for a class of request and revising the model in accordance with predetermined criteria.

12 Claims, 4 Drawing Sheets

(51) Int. Cl.
  *G06F 16/23* (2019.01)
  *G06F 16/248* (2019.01)
  *G06F 9/448* (2018.01)

(56) References Cited

U.S. PATENT DOCUMENTS

| | | | |
|---|---|---|---|
| 2005/0203921 | A1 | 9/2005 | Newman et al. |
| 2006/0212438 | A1 | 9/2006 | Ng |
| 2007/0016685 | A1 | 1/2007 | Crume |
| 2007/0156666 | A1 | 7/2007 | Vanriper et al. |
| 2010/0023503 | A1 | 1/2010 | Baris et al. |
| 2011/0271146 | A1 | 11/2011 | Mork et al. |
| 2014/0201838 | A1 | 7/2014 | Varsanyi et al. |
| 2014/0337276 | A1 | 11/2014 | Iordanov |
| 2015/0019584 | A1 | 1/2015 | Berg et al. |
| 2016/0314212 | A1* | 10/2016 | Menday ............ G06F 16/90335 |
| 2016/0337400 | A1 | 11/2016 | Gupta |
| 2017/0083703 | A1 | 3/2017 | Abbasi et al. |

FOREIGN PATENT DOCUMENTS

| | | | |
|---|---|---|---|
| WO | WO 2017/167546 A1 | 10/2017 | |
| WO | WO-2017167543 A1 | 10/2017 | |

OTHER PUBLICATIONS

International Preliminary Report on Patentability for corresponding PCT Application No. PCT/EP2017/055080, dated Oct. 2, 2018, 12 pages.
International Search Report and Written Opinion for corresponding PCT Application No. PCT/EP2017/055080, dated Apr. 4, 2017, 16 pages.
International Preliminary Report on Patentability for corresponding PCT Application No. PCT/EP2017/055084, dated Oct. 2, 2018, 5 pages.
International Search Report and Written Opinion for corresponding PCT Application No. PCT/EP2017/055084, dated Mar. 29, 2017, 7 pages.
Wen-Syan Li et al., "Load and Network Aware Query Routing for Information Integration", Data Engineering, 2005. ICDE 2005. Proceedings. 21$^{st}$ International Con Ference on Tokyo, Japan Apr. 5-8, 2005, Piscataway, NJ, USA, IEEE, Apr. 5, 2005 (Apr. 5, 2005), pp. 927-938, XP010788240.
Josifovski V et al., "Garlic: A New Flavor of Federal Query Processing for DB2", Proceedings of the ACM Sigmod International Conference on Management of Data: Jun. 3-6, 2005, Madison Association for Computing Machinery, New York, NY, US, Jun. 4, 2002 (Jun. 4, 2002), pp. 524-532, XP002390477.
Stonebraker, Mike et al., "C-Store: A Column-oriented DBMS", Proceedings of the 31$^{st}$ VLDB Conference, Sep. 2, 2005 (Sep. 2, 2005), pp. 553-564, XP055298338.
Lamb, Andrew et al., "The Vertica Analytic Database: CStore 7 Years Later", Proceedings of the VLDB Endowment, vol. 5, No. 12, Aug. 31, 2012 (Aug. 31, 2012), pp. 1790-1801, XP055293327.

Chawathe Sudarshan et al., "The TSIMMIS Project: Integration of Heterogeneous Information Sources", Proceedings of IPSJ Conference, Oct. 13, 1994 (Oct. 13, 1994), pp. 7-18, XP055298321.
Tomasic Anthony et al., "Scaling access to heterogeneous data sources with DISCO" IEEE Transactions on Knowledge and Data Engineering, vol. 10, No. 5, Oct. 1, 1998 (Oct. 1, 1998), pp. 808-823, XP055298330.
Stonebraker, Michael et al., "Mariposa: a wide-area distributed database system", VLDB Journal, vol. 5, No. 1, Jan. 1, 1996 (Jan. 1, 1996), pp. 48-63, XP055298327.
Stonebraker, Michael et al., "Mariposa: a new architecture for distributed data", Proceedings of 1994 IEEE 10$^{th}$ International Conference on Data Engineering, Feb. 14, 1994 (Feb. 14, 1994), pp. 54-65, XP055114946.
Ford, Neal, "Polyglot Programming", Dec. 5, 2006 memeagora. blogspot.co.uk/2006/12/polyglot-programming.html, 6 pages.
Fowler, Martin, "PolyglotPersistence", Nov. 17, 2011, martinfowler. com/bliki/PolyglotPersistence.html, 4 pages.
Leberknight, Scott, "Polyglot Persistence", Oct. 15, 2008, www. sleberknight.com/blog/sleberkn/entry/polyglot_persistence, 2 pages.
Mallette S., "Polyglot Persistence and Query with Gremlin", Feb. 4, 2013, thinkaurelius.com/2013/02/04/polyglot-persistence-and-query-with-gremlin, 9 pages.
McHenry, Kenton et al., "A Mosaic of Software", 2011 Seventh IEEE International Conference on eScience, 8 pages.
Gremlin, "Apache TinkerPop Website", Feb. 8, 2016, http://tinkerpop. incubator.apache.org, 3 pages.
Sadalage, Pramodkumar J. et al., "NoSQL: A Brief Guide to the Emerging World of Polyglot Persistence Distilled", Addison-Wesley, ISBN 978-0-321-82662-6, Sep. 2013, 304 pages.
Castrejón, Juan et al., "ExSchema: Discovering and Maintaining Schemas from Polyglot Persistence Applications" 2013 IEEE International Conference on Software Maintenance, 4 pages.
Seelam, Seetharami R. et al., "Polyglot Application Auto Scaling Service for Platform As a Service Cloud" 2015 IEEE International Conference on Cloud Engineering, 8 pages.
Abhishek Tiwari, "Polyglot Persistence Patterns", http://abhishek-tiwari.com, Aug. 30, 2012, 6 pages.
Communication Pursuant to Article 94(3) EPC for Application No. 17708273.2, dated May 11, 2020, 5 pages.
Communication pursuant to Article 94(3) EPC for Application No. 17710163.1, dated Apr. 3, 2020, 7 pages.
Criscione., et al., "Integrated Detection of Attacks Against Browsers, Web Applications and Databases," 2009 European Conference on Computer Network Defense, pp. 37-45.
Extended European Search Report for Application No. 16162894.6, dated Aug. 5, 2016, 7 pages.
Extended European Search Report for European Application No. 16162909.2, dated Sep. 22, 2016, 18 pages.
Sellami R., et al., "ODBAPI: A Unified REST API for Relational and NoSQL Data Stores," 2014, IEEE International Congress on Big Data, 8 pages.

* cited by examiner

MULTIFORM PERSISTENCE ABSTRACTION

CROSS-REFERENCE TO RELATED APPLICATION

The present application is a National Phase entry of PCT Application No. PCT/EP2017/055080, filed Mar. 3, 2017, which claims priority from EP Patent Application No. 16162909.2, filed Mar. 30, 2016 each of which is hereby fully incorporated herein by reference.

TECHNICAL FIELD

The present disclosure relates to persistent data stores. In particular it relates to multiform persistent data stores.

Computing software and services can require the storage of data in a structured data store to provide data and/or state persistence such that data and/or state have potential to outlive processes creating, accessing and/or processing it. Such structured data stores can be constituted as separate software or services implemented in potentially multiple different ways and storing data in potentially multiple different arrangements including: different data structures; different data formats; different data storage and/or retrieval mechanisms; different data indexing methodologies; different data referencing mechanisms; different techniques to represent, codify, store or otherwise record interrelationships between data stores and items or collections of data stored therein; and other difference mechanisms or manners of data and/or state persistence. These differences arise as data storage arrangements develop to address requirements of software applications. Examples of different and potentially disparate arrangements of data storage include, inter alia, Amazon SimpleDB, Google Bigtable, Microsoft SQL Server Data Services (SSDS) and CouchDB.

In 2006 software architect Neal Ford wrote of "Polyglot Programming" describing how software applications can be developed using a mixture or combination of different programming languages (memeagora.blogspot.co.uk/2006/12/polyglot-programming.html) to take advantage of the suitability of different languages for tackling different problems. Complex applications can include different types of problem and selecting appropriate programming languages for a development can be more productive than trying to fit all aspects into a single language (martinfowler.com/bliki/PolyglotPersistence.html). Developing this concept further, in 2008 software architect Scott Leberknight described Polyglot Persistence as choosing the right persistence option for a task at hand (www.sleberknight.com/blog/sleberkn/entry/polyglot_persistence). The multiple and potentially disparate data store technologies available can each have strengths and weaknesses for different applications and/or problem domains. Relational databases such as MySQL, Oracle or Microsoft SQL Server organize data into tables with rows and columns, using a schema to help govern data integrity. A document store or document-oriented database such as MongoDB, CouchDB, or RavenDB, organizes data as one or more documents which may be semi-structured as, for example, nested maps and encoded to some format such as JSON. Graph databases employ one or more data structures that organize data into vertices and edges where the edges connect those vertices via some relationship. Graphs can represent a natural way to model real-world relationships between entities. Examples of graph databases include Titan, Neo4j, OrientDB, Dex and InfiniteGraph. Thus different data stores can be employed to address different application requirements where applications are multifarious in nature. Some data for an application can be stored in multiple data stores for different purposes, such as: a first data store for speed of sequential access; a second data store for speed of random access; a third data store for completeness of relationships between data entities, and so on.

In addition to polyglot persistence, a single data store can be adapted to hold, record, store or contain data in potentially multiple different arrangements such as different data formats, different data structures, different data organization and the like. For example a single Hadoop cluster can contain data organized in both a Parquet format and an Apache Avro format even where there is commonality between the data in each format. Accordingly the differing arrangements, formats, structures, characters and embodiments within one or more or between multiple data stores constitutes multiform persistence as the persistence mechanism(s) take at least two forms whether within a single data store/database or between multiple such entities.

In spite of the benefits of multiform persistence for software applications and users, the development and arrangement of such applications to employ multiform persistence mechanisms presents considerable challenges. In order for applications to operate with potentially multiple potentially disparate data stores or data stores arranged in potentially multiple ways to realize the benefits of multiform persistence mechanisms requires considerable investment at application design and development time. The interoperation with multiform persistence itself presents challenges, requiring potentially multiple database drivers, access agents or application programming interfaces (APIs) and providing flexibility of data store access and marshalling of queries can involve bespoke development or complex data access control within an application.

The "Gremlin" tool is a domain specific language (DSL) for traversing graphs ("Polyglot Persistence and Query with Gremlin", Mallette S., 2013, thinkaurelius.com/2013/02/04/polyglot-persistence-and-query-with-gremlin). Gremlin provides a terminal interface through which "polyglot queries" can be executed to blend data together from a variety of data sources and data storage types to produce a single result set. While the Gremlin tool permits applications and users to query multiple data stores, each query must be developed with the particular data stores in mind. Accordingly, in Gremlin, the opportunity to benefit from potentially varying suitability of data stores by polyglot persistence is tightly coupled to, and dependent upon, the quality of programming and configuration of an application employing the Gremlin tool so not overcoming the considerable design and development burdens associated with multiform persistence.

SUMMARY

Thus there is a need to address the considerable disadvantages of the known techniques to provide for data access to multiform data store(s).

The present disclosure accordingly provides, in a first aspect, a computer implemented method of data access to data stored in one or more data stores comprising: receiving a request to retrieve data from the one or more data stores; extracting characteristics of the request to classify the request according to a request classification; identifying a model for execution of one or more queries to one or more data stores; and execute the one or more queries according to the model to formulate a response to the request, wherein the model for execution is identified based on a class of the request and includes an identification of one or more data stores to which the one or more queries are to be directed to formulate the response, and the method further comprising: monitoring execution of one or more queries for a class of request and revising the model in accordance with predetermined criteria.

In some embodiments monitoring the execution of one or more queries includes monitoring one or more of: a frequency of occurrence of one or more queries for a class of request; and monitoring a response time of one or more queries for a class of request.

In some embodiments the method further comprises monitoring a volume of requests for a class of request.

In some embodiments the model includes an identification of a particular configuration of a data store to which to direct the query.

In some embodiments the model further includes a definition of one or more rules for execution of the queries for the request, the rules defining conditions for determining one or more of: when the queries for the request should be executed; when the queries for the request should be postponed for execution at a later time; and when the queries for the request should not be executed.

In some embodiments, in response to a determination that a model for a class of the request does not exist, a model for the request is defined based on a data discovery method for data identified by the request comprising identifying one or more of the data stores storing data identified by the request.

In some embodiments the predetermined criteria include one or more of: a threshold number of requests for a class of request; a threshold rate of receipt of requests for a class of request; and a threshold duration of a time period occurring between receipt of the request and formulation of the response.

In some embodiments the one or more data stores provide multiform persistence for data and at least one of the data stores is characterized by storing data according to multiple different data arrangements.

In some embodiments the one or more data stores provide multiform persistence for data and at least two of the data stores are characterized by storing data according to different data arrangements.

In some embodiments the one or more data stores provide polyglot persistence.

The present disclosure accordingly provides, in a second aspect, a computer system including a processor and memory storing computer program code for performing the method described above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION

Figure 1:
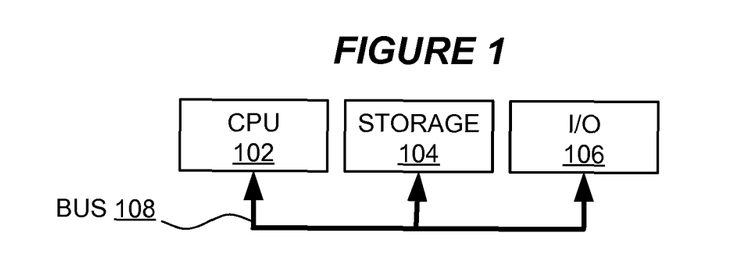
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
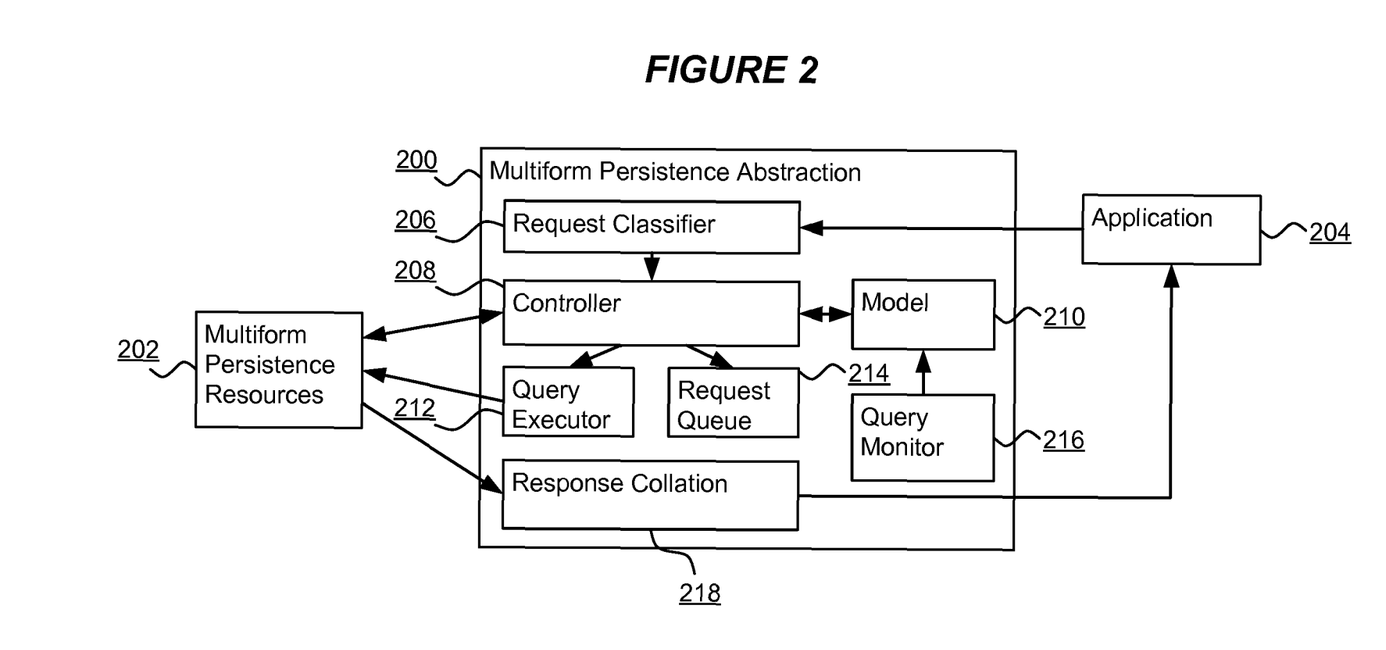
FIG. 2 is a component diagram of a multiform persistence abstraction component in accordance with an embodiment of the present disclosure.

FIG. 2 is a component diagram of a multiform persistence abstraction component 200 in accordance with an embodiment of the present disclosure. The component 200 is a hardware, software, firmware or combination component in communication with a software application 204 and multiform persistence resources 202. The application 204 can be any software component for requesting data services such as an application requesting data from, and possibly storing data to, a data service provider. The application 204 and the data service provider may be collocated in physical or virtual computing resource or may be communicatively connected such as by way of any suitable network connection.

The multiform persistence resources 202 include one or more data stores such as databases, data repositories and the like for the storage of data in a persistent manner relative to software processes accessing data stored therein. The data stores are multiform in that data is stored in different forms. For example, a single data store can store data according to two different data arrangements such as a Hadoop cluster storing data in two formats: a Parquet format; and an Avro format. Additionally or alternatively multiple data stores can be provided as different data services, databases, data storage mechanisms or the like. For example, one data store can be a relational database and another data store can be a graph database. Notably such an arrangement of multiple different or disparate data stores is referred to as polyglot persistence.

The multiform persistence abstraction component 200 is provided with, as part of or in communication with a data service provider in communication with the multiform persistence resources 202. The multiform persistence abstraction component 200 is an intermediary between the application 204 requesting data services and the persistence resources 202. For example, the multiplatform persistence abstraction component 200 can be implemented as a proxy, intermediate server, agent or other component accessible to the application 204. The component 200 receives a request from the application 204 to retrieve data from one or more data stores constituting the multiplatform persistence resources 202. The component 200 obtains and formulates a response to the request and provides the response to the application 204. In a preferred embodiment the request from the application 204 is a data request in a generalized format such as a generalized query format such that the component 200 provides an abstraction between the application and the persistence resources 202 that may employ different request or query formats. For example the persistence resources 202 may include: a mongoDB document oriented database from which documents are retrieved using specific mongoDB requests; and an relational database from which data records are retrieved using standard query language (SQL) commands. In such an exemplary arrangement the format of the request from the application 204 is abstracted from either the mongoDB request format and the SQL format such that the application 204 is decoupled from any one particular data store of the multiform persistence resources 202. The provision of a generalized request format suitable for expressing requests for data stored in any of a number of different data stores or in a data store having data organized in a number of different ways can be readily provided by abstracting the query languages, request frameworks, APIs and the like of the persistence resources 202. Such similar techniques for generalized query formats will be known to those skilled in the art such as with reference to the Gremlin programming language developed by Apache TinkerPop of the Apache Software Foundation and "polyglot queries" as described at thinkaurelius.com/2013/02/04/polyglot-persistence-and-query-with-gremlin and available from tinkerpop.incubator.apache.org.

Furthermore, the multiform persistence abstraction component 200 is adapted to formulate a response to the request of the application 204 such that, where the request can be fulfilled, the response satisfies the request. Thus, a request for data from multiform persistence resources 202 will be met with a response by the abstraction component 200 including the requested data. In some embodiments the response is formatted as one or more data items in one or more data structures for communication or making available to the application 204. Further preferably the response is formatted according to a generalized response format that is not necessarily specific to any one particular data store, database or other entity of the multiform persistence resources 202. Thus a format of the response is preferably a generalized and/or abstracted format for which the application 204 is adapted to receive. Responses formatted in such a generalized manner according to, for example, a specified generalized format, permit the design and development of the application 204 without concern for the multiple possible response formats for queries to each individual data store or organization of data store of the multiform persistence resources 202.

Thus in use the multiform persistence abstraction component 200 receives a request and provides a response. Additionally the component 200 provides abstraction between the generalized application request and response formats and the specific query and result formats of individual multiform persistence resources 202. In this way the application 204 is provided with reference to the generalized interface of the abstraction component 200 so decoupling the application 204 from individual data sources and simplifying the design, development, deployment and revision of the application and also providing for the modification, replacement, addition or removal of persistence resources. Furthermore, the component 200 is adapted to control request processing for application requests based on an execution model 210 for the request. An execution model 210 is identified from a set of one or more models and defines one or more data stores in the multiform persistent resources 202 for which queries can be executed to satisfy all or part of the request. Additionally, the model 210 defines rules for executing queries directed to the multiform persistence resources 202 in dependence on characteristics of the application request as will be described below.

The multiform persistence abstraction component 200 includes a request classifier as a hardware, software, firmware or combination component for classifying received application data service requests. Such classification for a request is achieved based on characteristics of the request such as: whether the request will result in the return of data (as opposed to requests that do not so result); keywords of the request; functions and operators of the request; description of the request; data items, field names, data structures or data structure elements of the request; a particular origin of the request (such as a source application identifier); a time of the request; length of the request; and other characteristics as will be apparent to those skilled in the art. The request can be classified according to a predefined classification scheme or a scheme learned from prior requests such as an automated classifier in which similar requests having a proportion of similar characteristics are classified similarly, such proportion being configurable according to, for example, a threshold proportion. Notably, where a request cannot be classified according to an existing classification, a default classification or new classification can be generated as can be configurable for the component 200.

Subsequently a controller 208 as a software, hardware, firmware or combination component is adapted to access the model 210 for the class of request and determine to which data store(s) and/or arrangement of data in data store(s) queries should be directed in order to formulate a response to the request. Further, the model 210 determines whether the queries should be executed, postponed or discarded based on the rules of the model. For example, rules defining a maximum rate of receipt of requests of a particular classification can determine whether queries for accessing data to formulate the response should be executed or postponed to some later time. Postponement of queries can be achieved by, for example, queuing queries or an entire request in a request queue 214 as a data structure or process for temporarily holding queries/requests for a determined period of time. The duration of postponement can be defined as part of the model 210 either explicitly or by way of evaluation. Alternatively the postponement can be conditional until a certain condition, state or occurrence is satisfied. Similarly the model 210 can define circumstances in which the request or queries for the request are discarded, disregarded or otherwise not executed. Thus rules of the model 210 for determining a model for execution of queries for the request can include, inter alia: a received volume of requests of a particular class or classes; a threshold rate of received requests of a particular class or classes; a resource consumption associated with requests of a particular class or classes; particular data store(s) or configurations of data store(s) required for execution of queries for a particular class or classes of request; a response time associated with requests of a particular class or classes; and other criteria as will be apparent to those skilled in the art.

Queries for a request are executed by a query executor 212 in communication with the multiform persistence resources 202. Responses to queries are received by a response collator 218 as a hardware, software, firmware or combination component. The response collator 218 is adapted to generate a response for the application 204 in the generalized response format. The generation of the response can include collation of data received from multiple data stores of the multiform persistence resources 202 in order to fully constitute the response. Thus in some embodiments the collator 218 performs a combining role of data such as a database join and the like.

A query monitor 216 is a hardware, software, firmware or combination component adapted to monitor the performance of query execution to identify update the model 210. For example the monitor 216 can identify: characteristics of the queries executed for the data stores on which basis a classification can be characterized such as keywords, functions, operators, description, data items, data types, formats and the like; statistics relating to the response time of data stores and the time to formulate a response for the application 204; an indication of whether the query execution was successful; an indication of a size, magnitude, extent or number of entries/data items in the response; a size of data stores addressed; and the like. Such performance information can be used to adapt characteristics associated with a classification for the request such that the characteristics can be applied to the rules of the model 210 for subsequent requests received in the same or a related classification.

By way of example, an application 204 generates a new request for data received by the multiform persistence abstraction component 200. The request does not conform to any existing classification of requests so the request classifier 206 generates a new classification and a new model 210 for the class. The new model 210 can be automatically generated based on defaults or user input and provides a model for execution of one or more queries to one or more data stores in order to satisfy the request. The controller 208 refers to the model which further includes rules for determining whether and how the queries for the request should be executed. Where the rules confirm that the queries should be executed the query executor 212 executes the queries by generating queries to satisfy the request and directing the queries to appropriate data stores identified by the model 210. The response collation component 218 receives the query results and formulates a response data structure for communication to the application 204. The query monitor 218 measures characteristics of the query execution and updates a definition of the class of the application request to reflect the characteristics of the request when the queries were executed. For example, the response time of the queries, the amount of data and the like can be characterized in the definition of the class. Subsequent requests received by the component 200 that are classified to the class will be processed by the controller 208 based on the updated class definition such that the rules of the model 210 may determine an adapted execution model such as queuing for postponement or discarding of a request.

Thus embodiments of the present disclosure are also particularly beneficial for providing control over classes of request in order to manage resources of both a data service provider and the multiplatform persistence resources 202. For example, volume, frequency, duration, and response time of requests in a particular class can inform a determination, by way of model rules, of how such requests are to be processed. Further, as processing of requests by way of query execution takes place, the query monitor 216 revises and adapts class definitions affecting the application of the model 210 such that the component 200 adapts to varying circumstances—such as increased load, increased throughput, reduced resource and the like.

Figure 3:
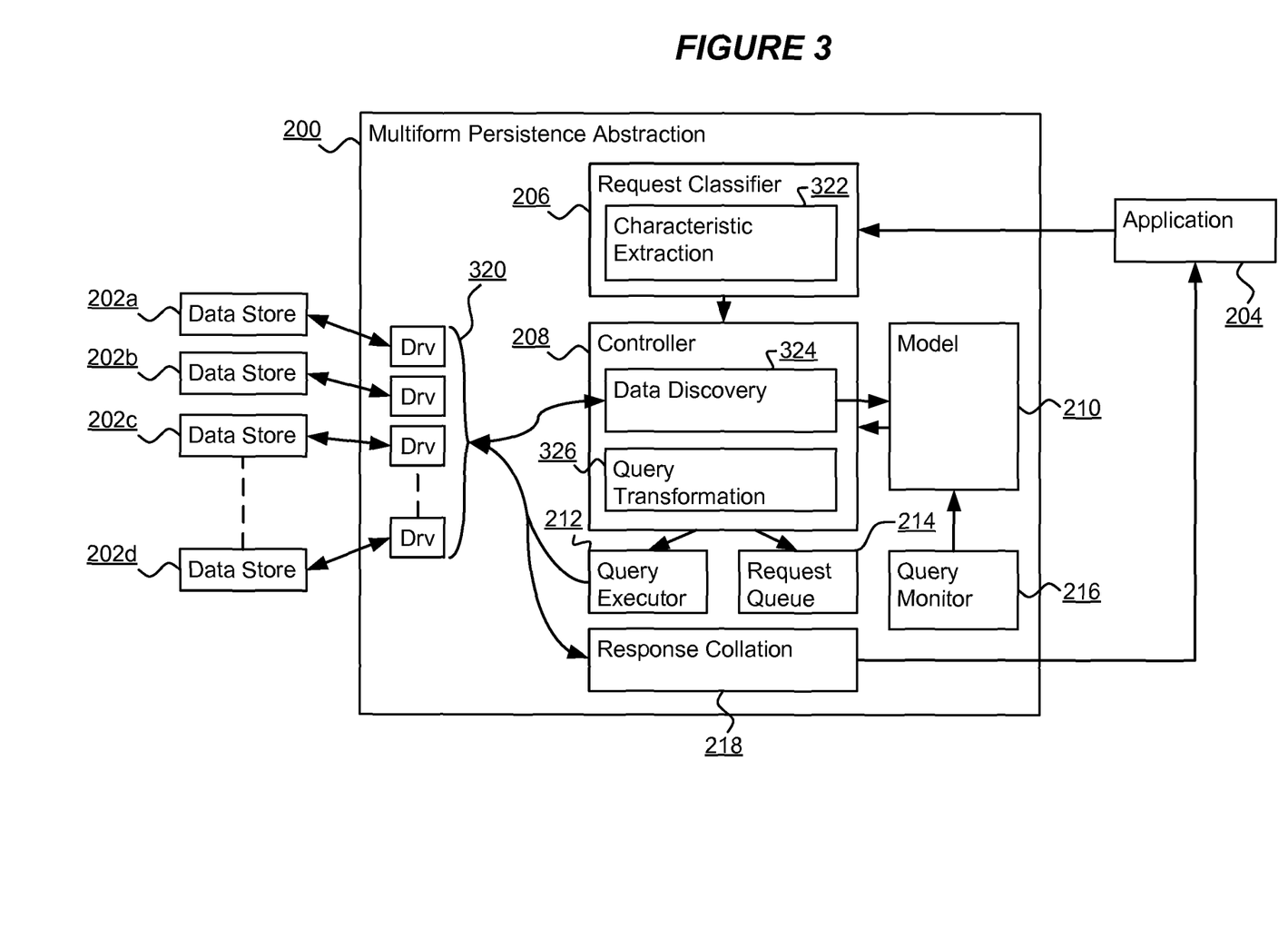
FIG. 3 is a component diagram of a multiform persistence abstraction component in accordance with an alternative embodiment of the present disclosure.

Further advantages of embodiments of the present disclosure will now be described with reference to FIG. 3. FIG. 3 is a component diagram of a multiform persistence abstraction component in accordance with an alternative embodiment of the present disclosure. Many of the elements of FIG. 3 are identical to those described above with respect to FIG. 2 and these will not be repeated here. In the exemplary arrangement of FIG. 3 the multiform persistence abstraction component 200 of FIG. 3 is operable in communication with a plurality of data stores 202a to d constituting polyglot persistence resources. Each data store is accessible by/to the multiform persistence abstraction 200 by way of data store or database drivers 320. Drivers 320 are software, hardware, firmware or combination components providing an interface between the abstraction component 200 and the data stores 202a to d. Each driver is specific to one or more data stores 202a to d as is known to those skilled in the art.

The request classifier of FIG. 3 further includes a characteristic extraction component 322 for extracting characteristics of an application request in order to classify the request. Thus individual characteristics of the request are obtained by the extraction component 322.

The controller of FIG. 3 further includes data discovery component 324 and query transformation component 326 as hardware, software, firmware or combination components. Data discovery component 324 is operable in conjunction with the data stores 202a to d via the drivers 320 to identify data stores suitable for satisfying all or part of the application request 204 by identification of data stores storing data relevant to the request. Thus the data discovery component accesses information for each data store relating to data stored. Depending on the nature of each data store 202a to d such access may be achieved differently such as: by way of an API call for the data store via a driver 320; by polling the data store via a driver 320; by sending one or more dummy or exploratory queries to the data store via driver 320; by accessing a schema, data dictionary or other data definition associated with the data store which may or may not be available via driver 320; and other techniques as will be apparent to those skilled in the art. Thus in this way the data discovery component 324 determines which data stores are required for queries to formulate a response to the application request. Such identified data stores are recorded in the model 210 in association with a classification of the request. In some embodiments the data discovery component 324 therefore helps facilitate the abstraction feature of the multiform persistence abstraction component 200 by permitting the automated identification of appropriate data stores for a class of request.

The query transformation component 326 further supports the abstraction function of the abstraction component 200 by providing for the transformation of all or part of the application request into queries specific to one or more data stores 202a to d in order to facilitate the execution of queries to receive query results suitable for formulating a response to the application. Thus the query transformation component 326 has associated information regarding each data store 202a to d required for satisfaction of an application request in order that all or part of the request can be converted, translated, recoded or otherwise recast as one or more data store queries for one or more data stores 202a to d.

In some embodiments the data discovery component 324 will identify multiple data stores 202a to d storing duplicate information required to satisfy the application request. Such identification can occur as data can be duplicated across multiple data stores to take advantage of the operational benefits of multiple different data storage resources for the same data. In such cases the controller 208 can employ a polyglot competition approach in which queries to multiple data stores 202a to d can be executed in order to race data stores to provide query results such that the component identifies a most responsive data store or data stores to address all or part of the application request. Accordingly, in some embodiments, the abstraction component 200 not only provides abstraction from multiform persistence for the application 204 but also provides for the automated identification of suitable data stores for satisfaction of a request and further the identification of most responsive data stores. Thus the execution model 210 identifying data stores and rules for a class of request can identify both suitable and efficient data stores for query execution.

Yet further, the use of a response collation component 218 provides for a split of queries for an application request between potentially multiple data sources so as to spread load, achieve a complete response or provide redundancy. Such splitting can also serve to provide integrity checking where queries are executed for data sources simultaneously and where one or more data sources may have speculative reliability, a combined set of results collated by the collation component 218 can be consulted first to reliably choose an appropriate response for the application 204.

Figure 4:
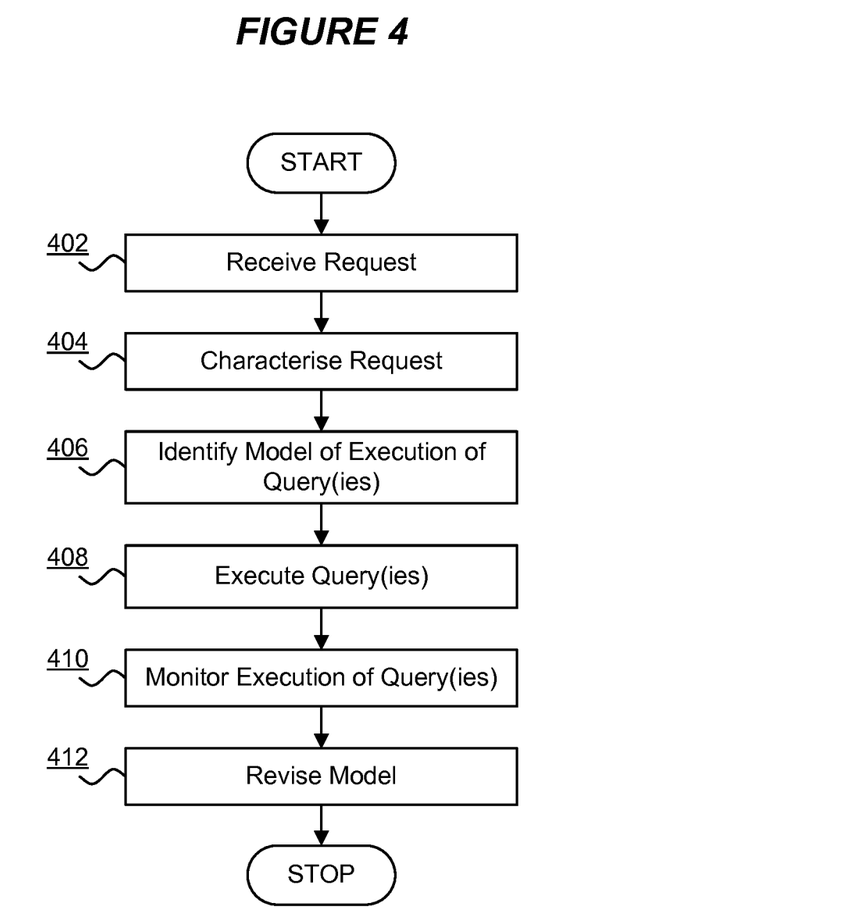
FIG. 4 is a flowchart of a method of a multiform persistence abstraction component in accordance with an embodiment of the present disclosure.

FIG. 4 is a flowchart of a method of a multiform persistence abstraction component in accordance with an embodiment of the present disclosure. Initially at 402 the abstraction component 200 receives an application request for data from an application 204. At 404 the request classifier 206 classifies the application request on the basis of characteristics of the request. At 406 the method identifies a model 210 of execution of one or more queries for the class of request and at 408 the model 210 is executed. The execution according to the model may involve executing queries, queuing queries or discarding queries according to rules associated with the model 210. At 410 (and previously such as simultaneously with at least 408) the method monitors the execution of the one or more queries in order to revise the model 310 as appropriate at 412.

Figure 5:
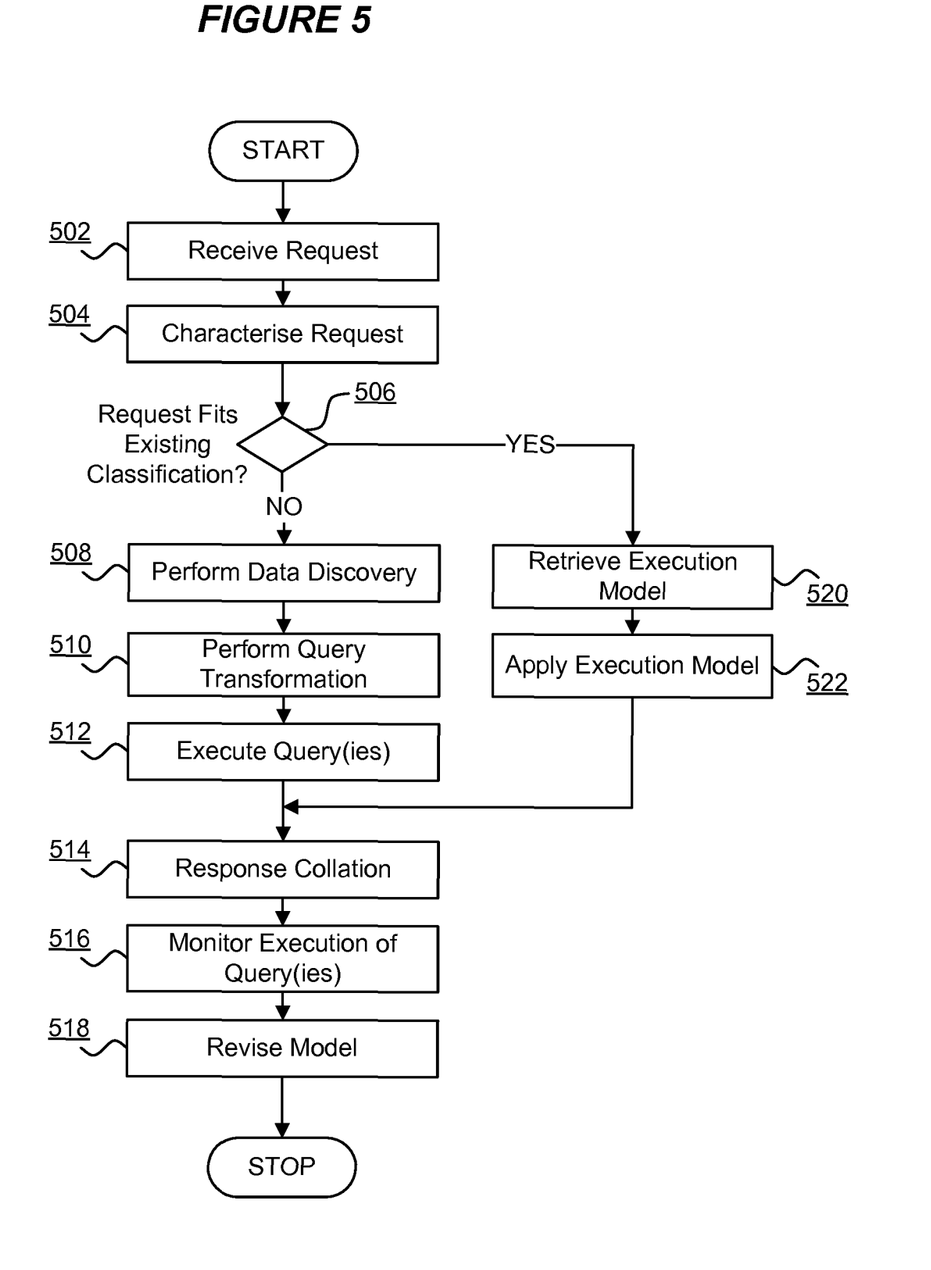
FIG. 5 is a flowchart of a method of a multiform persistence abstraction component in accordance with an alternative embodiment of the present disclosure.

FIG. 5 is a flowchart of a method of a multiform persistence abstraction component in accordance with an alternative embodiment of the present disclosure. The flowchart of FIG. 5 elaborates some of the tasks of the flowchart of FIG. 4 with reference to the features of FIG. 3. At 502 the method receives an application request for data from an application 204. At 504 the request classifier 206 classifies the application request on the basis of characteristics of the request such as by use of the characteristic extraction component 322. At 506 the method determines if the request can be classified according to an existing classification. Where the request can be so classified the method proceeds to 520 and a model 210 of execution for queries of the data sources for the class is retrieved. Subsequently at 522 the model 210 is applied by executing queries for data stores identified by the model 210 in accordance with the rules of the model 210. Where the method determines that the request cannot be classified according to an existing classification at 506 the method proceeds to 508. At 508 the data discovery component 324 identifies data stores 202a to d suitable for providing data to formulate a response to the application request. At 510 the query transformation component 326 generates data store queries for the identified data stores so as to obtain data to formulate a response to the application request. In one embodiment, and not shown in FIG. 4, the method generates a new model 210 for a new classification of request characterized by the characteristics of the application request. At 512 the method executes the queries for the identified data stores. Both 522 and 512 lead to 514 in which the collation component 218 receives query results from data stores and collates results as required to formulate a response for the requesting application 204. At 518 the query monitor (whose monitoring preferably occurs across each of 512/522 at least) revises the model 510 based on the information and/or statistics elicited during monitoring.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of data access to data stored in one or more data stores comprising:
    receiving a request to retrieve data from the one or more data stores;
    extracting characteristics of the request to classify the request in a class according to a request classification;
    identifying a model for execution of one or more queries to one or more data stores;
    executing the one or more queries according to the model to formulate a response to the request, wherein the model for execution is identified based on the class of the request and includes an identification of one or more data stores to which the one or more queries are to be directed to formulate the response; and
    monitoring execution of the one or more queries for the class of request and revising the model in accordance with predetermined criteria.

2. The method of claim 1, wherein monitoring the execution of one or more queries includes monitoring one or more of: a frequency of occurrence of one or more queries for the class of request; or monitoring a response time of one or more queries for the class of request.

3. The method of claim 1, wherein the method further comprises monitoring a volume of requests for the class of request.

4. The method of claim 1, wherein the model includes an identification of a particular configuration of a data store to which to direct the query.

5. The method of claim 1, wherein the model further includes a definition of one or more rules for execution of the queries for the request, the one or more rules defining conditions for determining one or more of: when the queries for the request should be executed; when the queries for the request should be postponed for execution at a later time; or when the queries for the request should not be executed.

6. The method of claim 1, further comprising:
  determining that the model for the class of the request does not exist; and
  in response to the determining, defining a particular model for the request based on a data discovery method for data identified by the request comprising identifying one or more of the data stores storing data identified by the request.

7. The method of claim 1, wherein the predetermined criteria include one or more of: a threshold number of requests for the class of request; a threshold rate of receipt of requests for the class of request; or a threshold duration of a time period occurring between receipt of the request and formulation of the response.

8. The method of claim 1, wherein the one or more data stores provide multiform persistence for data and at least one of the data stores is characterized by storing data according to multiple different data arrangements.

9. The method of claim 1, wherein the one or more data stores provide multiform persistence for data and at least two of the data stores are characterized by storing data according to different data arrangements.

10. The method of claim 1, wherein the one or more data stores provide polyglot persistence.

11. A computer system comprising:
a processor and memory storing computer program code for data access to data stored in one or more data stores, the processor and memory configured to:
  receive a request to retrieve data from the one or more data stores;
  extract characteristics of the request to classify the request in a class according to a request classification;
  identify a model for execution of one or more queries to one or more data stores;
  execute the one or more queries according to the model to formulate a response to the request, wherein the model for execution is identified based on the class of the request and includes an identification of one or more data stores to which the one or more queries are to be directed to formulate the response; and
  monitor execution of the one or more queries for the class of request and revising the model in accordance with predetermined criteria.

12. A non-transitory computer-readable storage medium storing a computer program element comprising computer program code to, when loaded into a computer system and executed thereon, cause the computer to:
  receive a request to retrieve data from the one or more data stores;
  extract characteristics of the request to classify the request in a class according to a request classification;
  identify a model for execution of one or more queries to one or more data stores;
  execute the one or more queries according to the model to formulate a response to the request, wherein the model for execution is identified based on the class of the request and includes an identification of one or more data stores to which the one or more queries are to be directed to formulate the response; and
  monitor execution of the one or more queries for the class of request and revising the model in accordance with predetermined criteria.

* * * * *